United States Patent [19]

Hill

[11] 4,161,079
[45] Jul. 17, 1979

[54] INSTANT MOUSE TRAP

[76] Inventor: Isaac Hill, 6340 S. Honore St., Chicago, Ill. 60636

[21] Appl. No.: 864,534

[22] Filed: Dec. 27, 1977

[51] Int. Cl.² ............................................. A01M 23/00
[52] U.S. Cl. ........................................ 43/58; 43/114; 43/131
[58] Field of Search ................... 43/58, 114, 115, 116, 43/131, 121

[56] References Cited

U.S. PATENT DOCUMENTS

| | | | |
|---|---|---|---|
| 2,291,358 | 7/1942 | Treadwell et al. | 43/131 |
| 2,896,361 | 2/1959 | Allen | 43/131 |
| 2,962,836 | 12/1960 | Hughes | 43/58 |
| 3,094,805 | 6/1963 | Luck | 43/131 |
| 3,320,692 | 5/1967 | Hellen | 43/131 |

FOREIGN PATENT DOCUMENTS 1463757 11/1966 France ........................................ 43/131

Primary Examiner—Nicholas P. Godici
Assistant Examiner—Robert P. Olszewski
Attorney, Agent, or Firm—Richard G. Kinney

[57] ABSTRACT

A disposable trap comprising odorless rubberized glue or like sticky surface for capturing a mouse or like pest, a cover over the surface which has provisions for at least one opening therein for allowing the mouse to enter, is disclosed, wherein a window or like is provided for allowing the user to inspect the interior to see if a mouse is trapped therein, and wherein externally activated internal bait means are provided which bait is stored in an enclosure, is in a sealed condition, but which may be exposed within the covered trap by manipulating an external activator such as a push up pedestal which is pushed up to break a membrane within the trap and expose a change of bait material.

10 Claims, 5 Drawing Figures

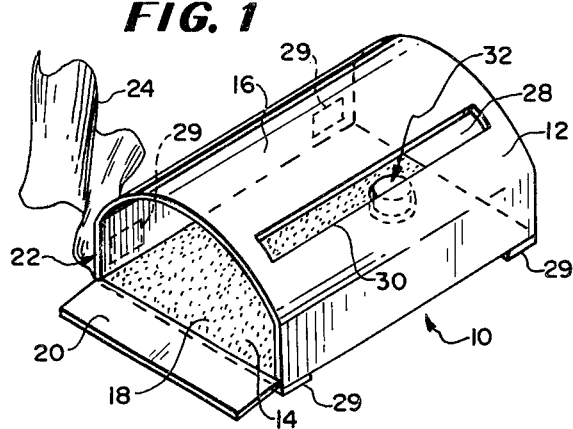
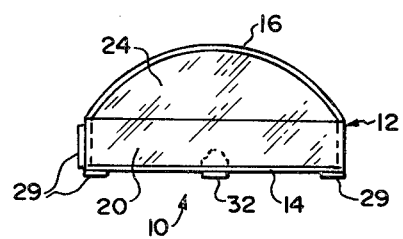
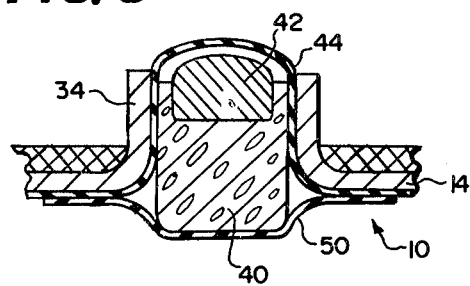
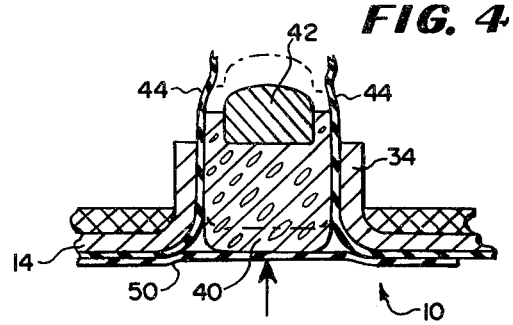
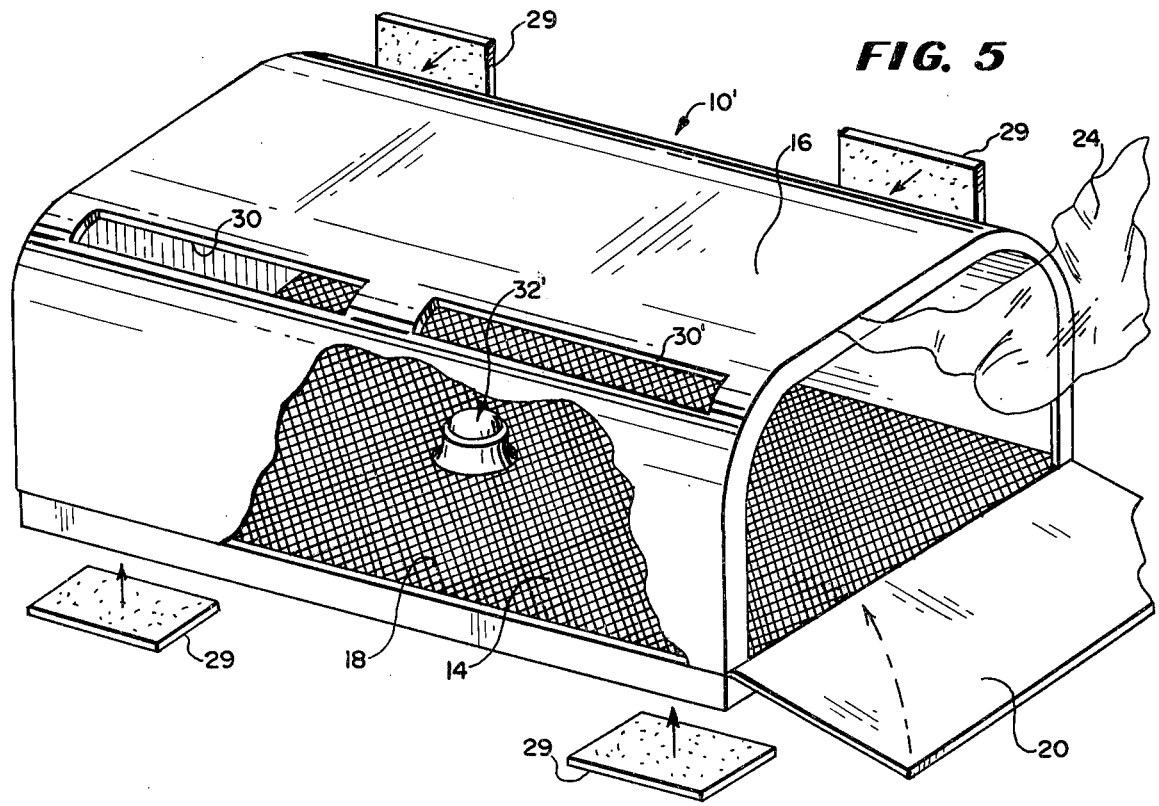

INSTANT MOUSE TRAP

FIELD OF THE INVENTION

The present invention is related to rodent traps and is especially concerned with improvement in a covered disposable mousetrap.

BACKGROUND OF THE INVENTION

The problem of trapping rodents and similar pests is one which mankind has been facing since prehistoric times. Numerous types of traps have been proposed, including those described in U.S. Pat. Nos. 3,864,866; 3,398,478; and 2,962,836.

SUMMARY OF THE INVENTION

A trap for rodents, mice and the like constructed in accordance with the present invention includes an enclosure with provisions for at least one opening to allow the rodent to enter the enclosure, means, such as a sticky inner surface, for ensnaring the rodent therein and externally operable means for uncovering or exposing to air bait material within the enclosure. This externally operable means may be a pedestal which extends without the enclosure and may be pressed into it to rupture a plastic membrane covering the bait, or it may take other forms.

The resultant trap has the virtue of long shelf life since the bait may remain enclosed until the unit is ready for use.

The invention is especially adaptable for a disposable trap as it may be constructed of relatively inexpensive materials. The enclosure isolates the ensnared pest and aids in keeping him in the unit, and allows for the entire trap to be picked up and disposed of without touching the pest itself.

The enclosure is preferably made of opague material so that the user need not view the pest in total, but is also provided, in accordance with one feature of the invention, with a small window or viewing slit so that the presence of a trapped pest can be easily observed.

The invention, together with the advantages thereof, may best be understood by reference to the following description taken in connection with the accompanying drawings, in the several figures of which like reference numerals identify like elements.

BRIEF DESCRIPTION OF THE FIGURES

FIG. 1 is a perspective view of a first embodiment of the present invention;

FIG. 2 is an end view of the trap of FIG. 1;

FIG. 3 is an enlarged detailed sectional view of a portion of the trap of FIGS. 1 and 2;

FIG. 4 is a view similar to that of FIG. 3 showing parts in moved position; and

FIG. 5 is a perspective view of an alternative embodiment of the invention.

DETAILED DESCRIPTION

Referring to FIG. 1, there is depicted a trap constructed in accordance with the principles of the present invention and generally designated by the number 10. The trap is of the type and size that can be used for catching mice but the general principles of the invention may be applied to larger traps.

The trap 10 includes an enclosure 12 which has a base or floor 14 and arching roof 16. The floor 14 is covered with a pest ensnaring material 18 such as rubberized cement or glue. The use of such a material in rodent traps is by itself old, as shown in the aforementioned U.S. Pat. No. 3,398,478 or 2,962,836 patents. It is preferably an odorless, non-aromatic substance and serves to trap the mouse or other rodent in a mesh of glue.

The trap 10 includes a ramp 20 attached at one end of the floor 14 which ramp 20 may be folded up during storage and shipment and may be pivoted down to provide an easy access route to the interior of the enclosure 12 through an opening 22. The opening 22 is preferably simply the end edge of the roof 16 and during storage or shipping, prior to use, is covered by a protective shield or seal sheet 24 with the ramp 20 folded up, as shown better in FIG. 2. The sheet 24 may be of clear plastic such as SARANWRAP (trademark) or of cellophane or the like, or may also be of metal foil glued with a pressure sensitive adhesive to the edge or adjacent outer surface of the roof 16 and floor 14. It is attached about the edge of the opening 22 and may be easily removed, as shown in FIG. 1, or an encircling tear strip similar to that commonly used in cigarette packages may be provided about the enclosure, or a line of weakened surface area provided in the plastic so as to facilitate its removal. The trap 10 is also provided with adhesive tabs 29, located preferably at the corners of the bottom of the floor 14 and also on one side which tabs may be of the double tape kind with a release paper over the adhesive. These tabs would allow the user to position and secure the trap where desired, even on an inclined surface, or on a wall surface at, e.g., the base molding height.

In accordance with one feature of the invention, the upper portion of the enclosure 12 is provided with a transparent strip or window 30 which is preferably made of clear plastic or cellophane, and which allows the user to easily inspect the trap to see if a mouse or like pest is entrapped therein. The strip 30 runs parallel to the long axis and allows a full inspection of the glue surface 18 while the opague portion of the roof 16 shields the perhaps unsightly entrapped animal from full view. The opposite end wall 28 of the relatively small trap 10 is preferably sealed off. Adjacent that wall is an externally operable bait unit 32 which is better seen in FIGS. 3 and 4.

Referring to those figures, the bait unit comprises a hollow cylindrical ring 34, formed of an up-turned portion of the floor 14, a push-up piston or pedestal 40 which includes bait material 42. The pedestal 40 is, as shown in FIG. 3, during storage covered by a plastic or like membrane 44 and is movable from the storage position to the activated position by pushing it upward from below the floor 14 so as to rupture the membrane 44 as shown in FIG. 4 and expose the bait material. Although numerous ways of achieving the same effect may be adopted, the particular way shown, which is the presently preferred mode, is to form the plastic membrane 44 as part of the outside of the trap 10 (which plastic layer may also serve to cover the window 30 and to provide the releasable seal) and to form it into the ring 34 as shown with the bait pedestal held in place by a round adhesive coated sheet 50 which also serves to seal the bait unit 40 and bait material 42.

As shown in phantom lines in FIG. 4, the bait piston 40 can be only advanced so far into the enclosure when the sheet 50 restrains further advances. The advancing of the sheet 50 to the bottom of the piston 40 prevents it from easily falling out of the ring 34.

In FIG. 5 a second embodiment of the invention is depicted and designated 10'. This version is of a larger size unit with a floor 14, a glue inner surface 18 and has an opening at both ends and a centrally located bait unit 32'. The pair of slits involves 30 and 30' along the roof 16. This unit is higher and wider than the previous one and can accomodate larger pests and/or a larger number of pests.

This second embodiment 10' also has side mounted double back tape 29 for mounting it to a floor or on a wall above the floor level; e.g., at base molding height.

The embodiments described, while the currently contemplated best mode of practicing the invention, should not be considered as exhaustive as the principles of the invention may find expression in many forms.

The traps 10 and 10' are preferably made with a cardboard roof and floor with a thicker and stronger cardboard used as the floor. The windows 30, 30' may be simply cutouts from the cardboard but are preferably covered by clear plastic which may be the outer wrapping of the trap and may also serve as the membrane 44 for the bait unit and the end seals, such as 24. An overall outer surface wrapping, e.g., heat-shrunk plastic, also serves to rigidify the enclosure. Of course, if desired separate units of plastic may be provided. The sticky rubberized surface 18 is preferably approximately a quarter of an inch in thickness and extends over the entire flat floor surface. The enclosure 14 may also be formed of other materials such as hard plastic. The trap 10 is preferably about 4 inches by six inches long inside and 2½ inches high. The trap 10' is preferably four inches in width by ten inches in length by three inches in height.

The bait material is preferably a gelatinous material impregnated with a favor such as peanut butter, prune, pineapple or wheat. Of course, other bait materials may be used without departing from the principles of the present invention.

While two particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention.

I claim:

1. A trap for rodents or like pests comprising:
   an enclosure for the pest to enter;
   means for ensnaring the pest in the enclosure;
   a charge of separately covered bait material mounted to the enclosure;
   means for uncovering said covered bait material within the enclosure, said means for uncovering being operable externally of said enclosure, whereby covered bait material may be stored for a long period of time and yet easily released when desired.

2. The invention of claim 1 wherein:
   said enclosure includes a window through which a user may look to see if a mouse or like pest is entrapped therein.

3. The trap of claim 1 wherein means for releasably securing the trap to a surface are provided.

4. The trap of claim 1 wherein said externally operable means is a piston which when moved inward ruptures a membrane to expose bait material within the interior of the trap.

5. A trap for mice or like pests comprising, in combination;
   a floor upon which there is provided a coating of pest-enmeshing sticky material,
   a covering over the floor which covering defines at least one entrance for the pest to enter,
   a bait unit extending within the enclosure formed by said floor and covering and including means operable from the outside of the enclosure to expose or release bait material from the unit within the enclosure.

6. The trap of claim 5 wherein:
   the covering includes at least one window through which the surface of the floor may be viewed to determine the presence of a pest; and
   said bait unit includes a membrane over a change of bait material within the enclosure and a piston movable from the bottom surface of the floor to rupture the membrane.

7. The trap of claim 6 wherein said trap is made of light weight disposable material and has means for releasably securing it in a desired location.

8. The trap of claim 7 wherein the trap is entirely enclosed and a removable sealing sheet is releasably secured over its opening, so that the trap may be stored for a long period of time and then activated by removing the sheet over the opening and activating the bait unit.

9. In a trap for a mouse or the like of the type having an enclosure in which the pest may enter and be held, the improvement comprising:
   a bait material covered by a membrane coupled to the enclosure; and
   means for manual operation from without the enclosure, for rupturing the membrane covering the bait material to thereby expose said bait material within the interior of the enclosure of the trap.

10. The improvement in a trap for a mouse or the like of claim 9 wherein said means for manual operation is a piston that may be pushed inward to stretch and rupture the membrane.

* * * * *